(12) United States Patent
Morizane

(10) Patent No.: US 11,121,431 B2
(45) Date of Patent: Sep. 14, 2021

(54) METHOD FOR PRODUCING NONAQUEOUS ELECTROLYTE SECONDARY BATTERY SEPARATOR

(71) Applicant: Sumitomo Chemical Company, Limited, Tokyo (JP)

(72) Inventor: Saki Morizane, Niihama (JP)

(73) Assignee: SUMITOMO CHEMICAL COMPANY, LIMITED, Tokyo (JP)

(*) Notice: Subject to any disclaimer, the term of this patent is extended or adjusted under 35 U.S.C. 154(b) by 164 days.

(21) Appl. No.: 16/679,456

(22) Filed: Nov. 11, 2019

(65) Prior Publication Data

US 2020/0075911 A1 Mar. 5, 2020

Related U.S. Application Data

(63) Continuation of application No. 15/910,400, filed on Mar. 2, 2018, now abandoned.

(30) Foreign Application Priority Data

Mar. 3, 2017 (JP) .............................. JP2017-041094

(51) Int. Cl.
*H01M 50/00* (2021.01)
*H01M 50/411* (2021.01)
(Continued)

(52) U.S. Cl.
CPC ....... *H01M 50/411* (2021.01); *H01M 50/403* (2021.01); *H01M 50/449* (2021.01)

(58) Field of Classification Search
CPC ... Y02E 60/10; H01M 50/403; H01M 50/449; H01M 2/16
See application file for complete search history.

(56) References Cited

U.S. PATENT DOCUMENTS

| 2009/0098465 A1 | 4/2009 | Kikuchi et al. |
| 2009/0117454 A1 | 5/2009 | Takita et al. |
| (Continued) | | |

FOREIGN PATENT DOCUMENTS

| CN | 101821876 A | 9/2010 |
| CN | 102326277 A | 1/2012 |
| (Continued) | | |

OTHER PUBLICATIONS

Office Action dated Mar. 21, 2018 in KR Application No. 10-2018-0025218.

(Continued)

*Primary Examiner* — Cynthia H Kelly
*Assistant Examiner* — Monique M Wills
(74) *Attorney, Agent, or Firm* — Panitch Schwarze Belisario & Nadel LLP

(57) ABSTRACT

The present invention provides, as a separator having both a sufficient level of safety and sufficient strength, a nonaqueous electrolyte secondary battery separator including a polyolefin porous film, the nonaqueous electrolyte secondary battery separator being arranged such that in regard to a surface of the nonaqueous electrolyte secondary battery separator, a product obtained by multiplying (a) a difference between a surface roughness in a machine direction obtained by a contact measurement and a surface roughness in the machine direction obtained by a non-contact measurement by (b) a difference between a surface roughness in a transverse direction obtained by a contact measurement and a surface roughness in the transverse direction obtained by a non-contact measurement is not less than 0.0020 and not more than 0.0280.

11 Claims, 2 Drawing Sheets

(51) Int. Cl.
*H01M 50/403* (2021.01)
*H01M 50/449* (2021.01)

(56) References Cited

U.S. PATENT DOCUMENTS

| | | |
|---|---|---|
| 2009/0123822 A1 | 5/2009 | Takita et al. |
| 2011/0206962 A1 | 8/2011 | Minami et al. |
| 2011/0300430 A1 | 12/2011 | Usami et al. |
| 2012/0028101 A1 | 2/2012 | Ishihara et al. |
| 2012/0028102 A1 | 2/2012 | Ishihara et al. |
| 2012/0028131 A1 | 2/2012 | Ishihara et al. |
| 2012/0034518 A1 | 2/2012 | Ishihara et al. |
| 2012/0034519 A1 | 2/2012 | Ishihara et al. |
| 2012/0040232 A1 | 2/2012 | Ishihara et al. |
| 2013/0337311 A1 | 12/2013 | Itou |
| 2014/0093687 A1 | 4/2014 | Humiston et al. |
| 2015/0017510 A1 | 1/2015 | Terado |
| 2015/0050545 A1* | 2/2015 | Murata ............... B32B 27/20 429/145 |
| 2015/0228949 A1 | 8/2015 | Mizuno et al. |
| 2015/0306539 A1 | 10/2015 | Yamato |
| 2016/0064713 A1 | 3/2016 | Itou |
| 2016/0268569 A1 | 9/2016 | Yashiki |
| 2017/0084898 A1 | 3/2017 | Stokes et al. |
| 2017/0155120 A1 | 6/2017 | Yoshimaru et al. |
| 2017/0162849 A1 | 6/2017 | Murakami et al. |
| 2017/0338458 A1 | 11/2017 | Itou |
| 2018/0097216 A1 | 4/2018 | Joo et al. |
| 2018/0114968 A1 | 4/2018 | Joo et al. |

FOREIGN PATENT DOCUMENTS

| | | |
|---|---|---|
| CN | 104999745 A | 10/2015 |
| EP | 3312221 A1 | 4/2018 |
| JP | 11-130900 A | 5/1999 |
| JP | 2007125821 A | 5/2007 |
| JP | 2009091461 A | 4/2009 |
| JP | 2011171250 A | 9/2011 |
| JP | 2016207649 A | 12/2016 |
| JP | 2017025294 A | 2/2017 |
| JP | 2017027945 A | 2/2017 |
| KR | 20120003864 A | 1/2012 |
| KR | 20140121457 A | 10/2014 |
| KR | 20160094846 A | 8/2016 |
| KR | 20160110162 A | 9/2016 |
| KR | 20160118966 A | 10/2016 |
| WO | 2012090632 A1 | 7/2012 |

OTHER PUBLICATIONS

Office Action dated Jul. 17, 2018 in KR Application No. 10-2018-0025218.

Office Action dated May 3, 2019 in U.S. Appl. No. 15/910,400 by Morizane.

Office Action dated Aug. 12, 2019 in U.S. Appl. No. 15/910,400 by Morizane.

Office Action dated Jan. 3, 2019 in CN Application No. 201810175530.8.

Office Action dated Nov. 27, 2018 in JP Application No. 2017-041094 (Partial Translation).

* cited by examiner

METHOD FOR PRODUCING NONAQUEOUS ELECTROLYTE SECONDARY BATTERY SEPARATOR

CROSS-REFERENCE TO RELATED APPLICATION

This application is a Continuation of U.S. patent application Ser. No. 15/910,400 filed Mar. 2, 2018, which claims priority under 35 U.S.C. § 119(b) to Japanese Application No. 2017-041094, filed Mar. 3, 2017, the disclosures of which are incorporated herein by reference in their entirety.

TECHNICAL FIELD

The present invention relates to (i) a separator for a nonaqueous electrolyte secondary battery (hereinafter referred to as a "nonaqueous electrolyte secondary battery separator"), (ii) a laminated separator for a nonaqueous electrolyte secondary battery (hereinafter referred to as a "nonaqueous electrolyte secondary battery laminated separator"), (iii) a member for a nonaqueous electrolyte secondary battery (hereinafter referred to as a "nonaqueous electrolyte secondary battery member"), and a nonaqueous electrolyte secondary battery.

BACKGROUND ART

Nonaqueous electrolyte secondary batteries such as a lithium secondary battery are currently in wide use as (i) batteries for devices such as a personal computer, a mobile telephone, and a portable information terminal or (ii) on-vehicle batteries.

As a separator for use in such a nonaqueous electrolyte secondary battery, a porous film containing polyolefin as a main component is mainly used.

As a porous base material useful as a nonaqueous electrolyte secondary battery separator, for example, Patent Literature 1 discloses a polyethylene macroporous film whose flexion rate, porosity, and average pore diameter are arranged to be in specific ranges, respectively, so that a film thickness and a porosity, which are necessary for having a sufficient strength, will be maintained and a high ion permeability will be realized.

CITATION LIST

Patent Literature

[Patent Literature 1] Japanese Patent Application Publication, Tokukaihei, No. 11-130900 (1999) (Publication Date: May 18, 1999)

SUMMARY OF INVENTION

Technical Problem

However, a conventional nonaqueous electrolyte secondary battery separator as disclosed in Patent Literature 1 was insufficient in that the conventional nonaqueous electrolyte secondary battery separator did not simultaneously have both high strength and a low shutdown temperature (SD temperature).

Solution to Problem

The present invention encompasses aspects described in the following [1] to [5].

[1] A nonaqueous electrolyte secondary battery separator including a polyolefin porous film, wherein:
in regard to a surface of the nonaqueous electrolyte secondary battery separator, a product obtained by multiplying (a) a difference between a surface roughness in a machine direction obtained by a contact measurement and a surface roughness in the machine direction obtained by a non-contact measurement by (b) a difference between a surface roughness in a transverse direction obtained by a contact measurement and a surface roughness in the transverse direction obtained by a non-contact measurement is not less than 0.0020 and not more than 0.0280.

[2] The nonaqueous electrolyte secondary battery separator as described in [1], having a film thickness of not more than 19.5 µm.

[3] A nonaqueous electrolyte secondary battery laminated separator including a nonaqueous electrolyte secondary battery separator as described in [1] or [2] and an insulating porous layer.

[4] A nonaqueous electrolyte secondary battery member including: a positive electrode; a nonaqueous electrolyte secondary battery separator as described in [1] or [2] or a nonaqueous electrolyte secondary battery laminated separator as described in [3]; and a negative electrode, the positive electrode, the nonaqueous electrolyte secondary battery separator or the nonaqueous electrolyte secondary battery laminated separator, and the negative electrode being disposed in this order.

[5] A nonaqueous electrolyte secondary battery including: a nonaqueous electrolyte secondary battery separator as described in [1] or [2] or a nonaqueous electrolyte secondary battery laminated separator as described in [3].

Advantageous Effects of Invention

Advantageously, a nonaqueous electrolyte secondary battery separator in accordance with an embodiment of the present invention has both an excellent piercing strength and an excellent shutdown temperature.

DESCRIPTION OF EMBODIMENTS

Figure 1:
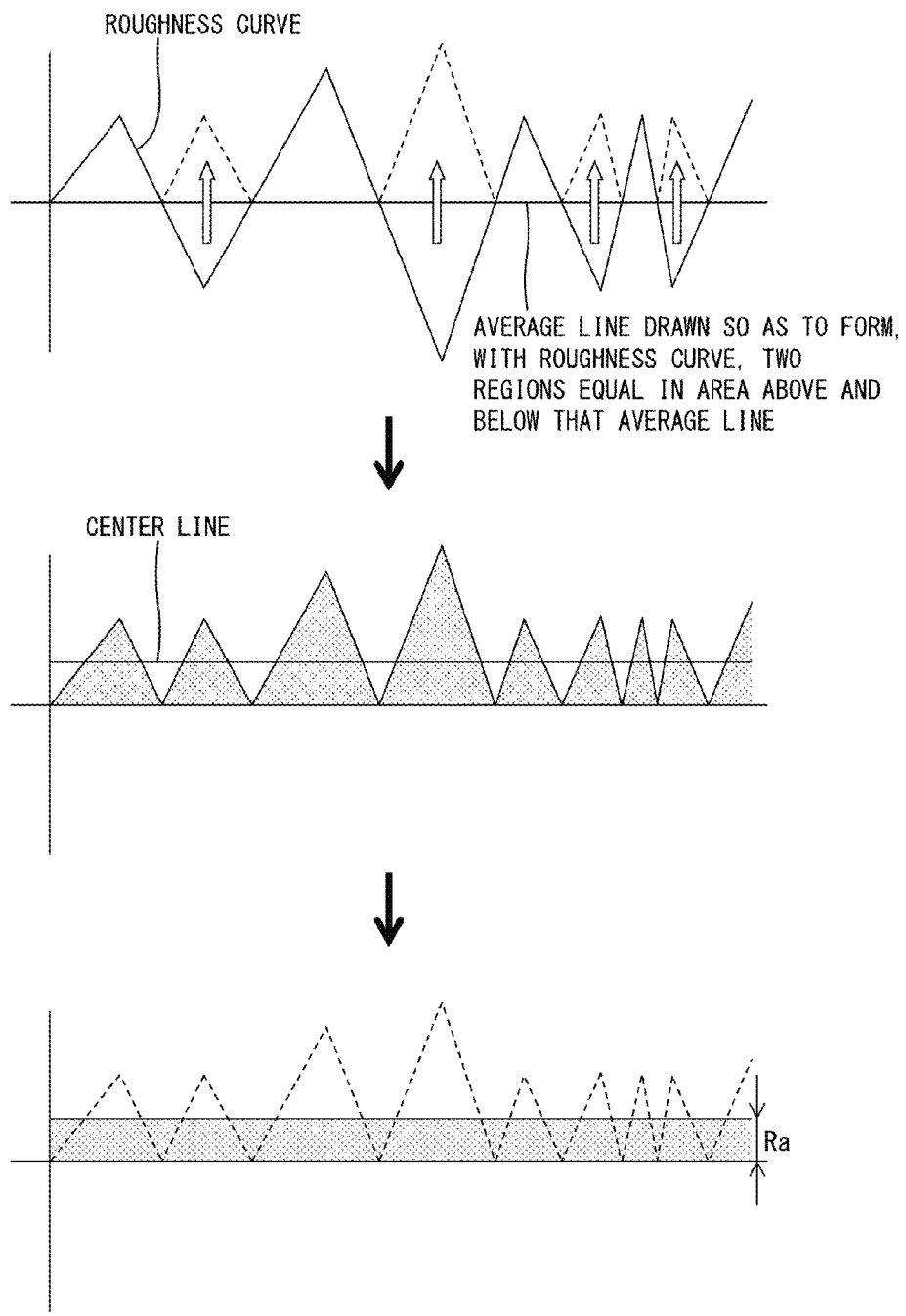
FIG. 1 is a schematic diagram for explaining a method for calculating a surface roughness (Ra) of a nonaqueous electrolyte secondary battery separator in accordance with an embodiment of the present invention.

The following description will discuss an embodiment of the present invention. The present invention is, however, not limited to the embodiment below. The present invention is not limited to the arrangements described below, but may be altered in various ways by a skilled person within the scope of the claims. Any embodiment based on a proper combination of technical means disclosed in different embodiments is also encompassed in the technical scope of the present invention. Note that numerical expressions such as "A to B" herein mean "not less than A and not more than B" unless otherwise stated.

[Embodiment 1: Nonaqueous Electrolyte Secondary Battery Separator]

A nonaqueous electrolyte secondary battery separator in accordance with Embodiment 1 of the present invention is a nonaqueous electrolyte secondary battery separator including a polyolefin porous film, wherein:

in regard to a surface of the nonaqueous electrolyte secondary battery separator, a product obtained by multiplying (a) a difference between a surface roughness in a machine direction (hereinafter, referred to as "MD") obtained by a contact measurement and a surface roughness in the MD obtained by a non-contact measurement by (b) a difference between a surface roughness in a transverse direction (hereinafter, referred to as "TD") obtained by a contact measurement and a surface roughness in the TD obtained by a non-contact measurement is not less than 0.0020 and not more than 0.0280.

Hereinafter, the surface roughness in the MD obtained by a contact measurement may be referred to as "$Ra_{contact, MD}$", the surface roughness in the TD obtained by a contact measurement may be referred to as "$Ra_{contact, TD}$", the surface roughness in the MD obtained by a non-contact measurement may be referred to as "$Ra_{non-contact, MD}$", and the surface roughness in the TD obtained by a non-contact measurement may be referred to as "$Ra_{non-contact, TD}$".

Note that the machine direction (MD) of a nonaqueous electrolyte secondary battery separator herein means a direction in which the nonaqueous electrolyte secondary battery separator is conveyed during production. Meanwhile, the transverse direction (TD) of a nonaqueous electrolyte secondary battery separator herein means a direction perpendicular to the MD of the nonaqueous electrolyte secondary battery separator.

The nonaqueous electrolyte secondary battery separator in accordance with Embodiment 1 of the present invention includes a polyolefin porous film, and is preferably constituted by a polyolefin porous film. Note, here, that the "polyolefin porous film" is a porous film which contains a polyolefin-based resin as a main component. Note that the phrase "contains a polyolefin-based resin as a main component" means that a porous film contains a polyolefin-based resin at a proportion of not less than 50% by volume, preferably not less than 90% by volume, and more preferably not less than 95% by volume, relative to the whole of materials of which the porous film is made.

The polyolefin porous film can be the nonaqueous electrolyte secondary battery separator in accordance with an embodiment of the present invention or a base material of a nonaqueous electrolyte secondary battery laminated separator in accordance with an embodiment of the present invention, which will be described later. The polyolefin porous film has therein many pores, connected to one another, so that a gas and/or a liquid can pass through the polyolefin porous film from one side to the other side.

The polyolefin-based resin more preferably contains a high molecular weight component having a weight-average molecular weight of $3 \times 10^5$ to $15 \times 10^6$. In particular, the polyolefin-based resin more preferably contains a high molecular weight component having a weight-average molecular weight of not less than 1,000,000 because the polyolefin porous film containing such a polyolefin-based resin and a nonaqueous electrolyte secondary battery laminated separator including such a polyolefin porous film each have a higher strength.

Examples of the polyolefin-based resin which the polyolefin porous film contains as a main component include, but are not particularly limited to, homopolymers (for example, polyethylene, polypropylene, and polybutene) and copolymers (for example, ethylene-propylene copolymer) both of which are thermoplastic resins and are each produced through (co)polymerization of a monomer(s) such as ethylene, propylene, 1-butene, 4-methyl-1-pentene, and/or 1-hexene. Among these, polyethylene is preferable as it is capable of preventing (shutting down) a flow of an excessively large electric current at a lower temperature.

$Ra_{contact, MD}$ and $Ra_{contact, TD}$ are each an average value of values which are obtained by carrying out a contact measurement two times. Meanwhile, $Ra_{non-contact, MD}$ and $Ra_{non-contact, TD}$ are each an average value of values which are obtained by carrying out a non-contact measurement five times.

The "surface roughness (Ra)" of the nonaqueous electrolyte secondary battery separator in accordance with an embodiment of the present invention herein indicates a value obtained as follows, from a curve (roughness curve) representing an uneven form of a surface of the nonaqueous electrolyte secondary battery separator. That is, as illustrated in FIG. 1, the roughness curve is folded at the center line such that a portion of the roughness curve above a center line is folded down. Then, an area of a region thus formed is divided by a length. A quotient thus obtained is expressed as a value in the unit of micrometer (μm). This value is the surface roughness.

The contact measurement is a method of measuring a surface roughness on the basis of a degree of unevenness (a depth of a depression and a height of a protrusion) of an uneven surface of the nonaqueous electrolyte secondary battery separator. This degree of unevenness is measured on the basis of a distance by which a probe for measurement moves up and down in accordance with the uneven surface of the nonaqueous electrolyte secondary battery separator when the prove is caused to sweep along the uneven surface in contact with the uneven surface. Note that the contact measurement can be measured by a commercially available contact-type surface roughness measurement apparatus. An example of the contact-type surface roughness measurement apparatus includes "HANDYSURF (E-35A)" manufactured by Tokyo Seimitsu Co., Ltd. which was used in Examples described later. Further, the surface roughness can be measured, for example, by the method described in Examples.

Note that in the contact measurement, the probe for measurement comes in contact with the nonaqueous electrolyte secondary battery separator. Therefore, when the probe sweeps on the nonaqueous electrolyte secondary battery separator, pressure is applied to a surface of the nonaqueous electrolyte secondary battery separator. Then, the nonaqueous electrolyte secondary battery separator deforms due to the pressure. This results in a difference between an actual degree of unevenness of the surface of the nonaqueous electrolyte secondary battery separator and a measured degree of unevenness of that surface.

A degree of such deformation of the nonaqueous electrolyte secondary battery separator depends on flexibility of the nonaqueous electrolyte secondary battery separator. The nonaqueous electrolyte secondary battery separator here includes a network structure constituted by a fibrous structure constituting a resin component. Therefore, in a case where the fibrous structure is more flexible, the nonaqueous electrolyte secondary battery separator deforms more. This results in a larger difference between an actual degree of unevenness of the surface of the nonaqueous electrolyte secondary battery separator and a measured degree of unevenness of that surface.

On the other hand, the non-contact measurement is a method of measuring a surface roughness on the basis of a degree of unevenness of a surface of a nonaqueous electrolyte secondary battery separator, which degree of unevenness is measured without causing a measurement apparatus to come in contact with the nonaqueous electrolyte secondary battery separator. There are various methods known as a method of such a non-contact measurement. Examples of the non-contact measurement include a method of measuring a surface roughness on the basis of a degree of unevenness of a surface of a nonaqueous electrolyte secondary battery separator, which degree of unevenness is measured on the basis of interference of light between irradiation light and reflected light, which interference of light is produced by, for example, (i) irradiating the surface of the nonaqueous electrolyte secondary battery separator with white light (irradiation light) and causing reflection of the irradiation light by the surface of the nonaqueous electrolyte secondary battery separator. More specifically, for example, the non-contact measurement can be carried out by a method described in Examples (described later) by using a non-contact-type roughness measurement apparatus ("VertScan [registered trademark] 2.0 R5500GML" manufactured by Ryoka Systems Inc.) described in the Examples.

In the non-contact measurement, the nonaqueous electrolyte secondary battery separator is never deformed by measurement. Therefore, a measured degree of unevenness of a surface of a nonaqueous electrolyte secondary battery separator becomes equal to an actual degree of unevenness of the surface of the nonaqueous electrolyte secondary battery separator.

Therefore, a larger "product of Ra differences" of the nonaqueous electrolyte secondary battery separator in accordance with an embodiment of the present invention means that the nonaqueous electrolyte secondary battery separator and the fibrous structure contained in the nonaqueous electrolyte secondary battery separator are more flexible.

The flexibility of the nonaqueous electrolyte secondary battery separator, that is, the flexibility of the fibrous structure is largely related to a degree of crystallinity of this fibrous structure.

Figure 2:
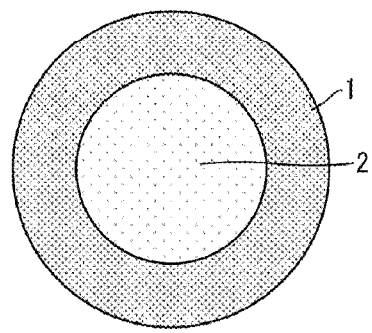
FIG. 2 is a schematic view (cross-sectional view) illustrating an example of a configuration of a fibrous structure which constitutes an internal structure of a nonaqueous electrolyte secondary battery separator.
Figure 3:
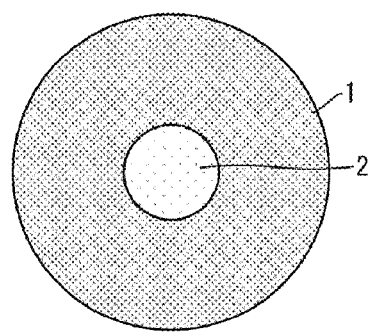
FIG. 3 is a schematic view (cross-sectional view) illustrating an example of a configuration of a fibrous structure which constitutes an internal structure of a nonaqueous electrolyte secondary battery separator.
Figure 4:
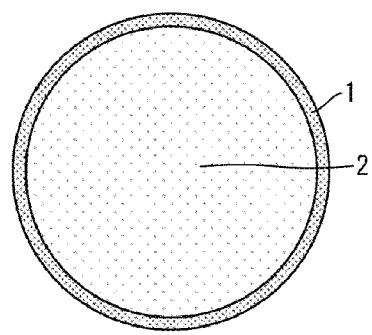
FIG. 4 is a schematic view (cross-sectional view) illustrating an example of a configuration of a fibrous structure which constitutes an internal structure of a nonaqueous electrolyte secondary battery separator.

Specifically, as illustrated in FIGS. 2 to 4, the structure of the fibrous structure includes a surface layer portion 1 and an interior portion 2. The surface layer portion 1 is mainly made of a crystalline portion whereas the interior portion 2 is mainly made of a non-crystalline portion. Further, the crystalline portion is harder, stronger, and more difficult to melt, as compared to the non-crystalline portion.

Accordingly, in a case where a proportion of the crystalline portion to the whole of the fibrous structure, that is, a proportion of the surface layer portion 1 to the whole of the fibrous structure is higher as illustrated in FIG. 3, the fibrous structure becomes harder and the "product of Ra differences" becomes smaller. In contrast, in a case where a proportion of the non-crystalline portion to the whole of the fibrous structure, that is, a proportion of the interior portion 2 to the whole of the fibrous structure is higher as illustrated in FIG. 4, the fibrous structure is more flexible and the "product of Ra differences" is larger.

Therefore, when the product of Ra differences of the nonaqueous electrolyte secondary battery separator in accordance with an embodiment of the present invention is not less than 0.0020, the proportion of the non-crystalline portion contained in the fibrous structure is higher. This allows the nonaqueous electrolyte secondary battery separator including the fibrous structure to have a sufficiently low SD temperature and an enhanced level of safety. In view of the above, the "product of Ra differences" is preferably not less than 0.0025 and more preferably not less than 0.0030.

Meanwhile, the strength (e.g., piercing strength) of the nonaqueous electrolyte secondary battery separator depends on the proportion of the crystalline portion contained in the fibrous structure. Therefore, when the "product of Ra differences" of the nonaqueous electrolyte secondary battery separator in accordance with an embodiment of the present invention is not more than 0.0280, the proportion of the crystalline portion contained in the fibrous structure becomes higher. This allows the nonaqueous electrolyte secondary battery separator to have a sufficiently increased strength. In view of the above, the "product of Ra differences" is preferably not more than 0.0250 and more preferably not more than 0.0200.

Therefore, when the "product of Ra differences" of the nonaqueous electrolyte secondary battery separator in accordance with an embodiment of the present invention is not less than 0.0020 and not more than 0.0280, the surface layer portion 1 and the interior portion 2 (the crystalline portion and the non-crystalline portion) constituting the fibrous structure are well-balanced as illustrated in FIG. 2, so that both the strength and the level of safety of the nonaqueous electrolyte secondary battery separator can be kept favorable in a well-balanced manner.

The nonaqueous electrolyte secondary battery separator in accordance with an embodiment of the present invention preferably has a smaller difference between (a) a difference between a surface roughness $Ra_{contact, MD}$ in the MD obtained by a contact measurement and a surface roughness $Ra_{non-contact, MD}$ in the MD obtained by a non-contact measurement ($|Ra_{contact, MD} - Ra_{non-contact, MD}|$) and (b) a difference between a surface roughness $Ra_{contact, TD}$ in the TD obtained by a contact measurement and a surface roughness $Ra_{non-contact, TD}$ in the TD obtained by a non-contact measurement ($|Ra_{contact, TD} - Ra_{non-contact, TD}|$). This is because, when the difference is smaller, the nonaqueous electrolyte secondary battery separator is more isotropic. Specifically, it is preferable that both of $|Ra_{contact, MD} - Ra_{non-contact, MD}|$ and $|Ra_{contact, TD} - Ra_{non-contact, TD}|$ be in a range of not less than 0.04 and not more than 0.30.

The thickness of the polyolefin porous film is not particularly limited, but is preferably 4 μm to 40 μm, and more preferably 5 μm to 20 μm.

The thickness of the polyolefin porous film is preferably not less than 4 μm since an internal short circuit can be sufficiently prevented with such a thickness.

On the other hand, the thickness of the polyolefin porous film is preferably not more than 40 μm since an increase in size of a nonaqueous electrolyte secondary battery can be prevented with such a thickness.

Further, the thickness of the nonaqueous electrolyte secondary battery separator in accordance with an embodiment of the present invention is particularly preferably not more than 19.5 μm, in view of reduction in size and increase in capacity of the nonaqueous electrolyte secondary battery separator.

The polyolefin porous film typically has a weight per unit area of preferably 4 g/m$^2$ to 20 g/m$^2$, and more preferably 5 g/m$^2$ to 12 g/m$^2$, so as to allow a nonaqueous electrolyte secondary battery to have a higher weight energy density and a higher volume energy density.

The polyolefin porous film has an air permeability of preferably 30 sec/100 mL to 500 sec/100 mL, and more preferably 50 sec/100 mL to 300 sec/100 mL, in terms of Gurley values, since a sufficient ion permeability is exhibited with such an air permeability.

The polyolefin porous film has a porosity of preferably 20% by volume to 80% by volume, and more preferably 30% by volume to 75% by volume, so as to (i) retain a larger amount of electrolyte and (ii) obtain the function of reliably preventing (shutting down) a flow of an excessively large electric current at a lower temperature.

The polyolefin porous film has a pore diameter of preferably not more than 0.3 μm and more preferably not more than 0.14 μm, in view of sufficient ion permeability and of preventing particles which constitute an electrode from entering the polyolefin porous film.

The nonaqueous electrolyte secondary battery separator in accordance with an embodiment of the present invention may include a porous layer as needed, in addition to the polyolefin porous film. Examples of the porous layer encompass an insulating porous layer constituting the nonaqueous electrolyte laminated separator (described later) and publicly known porous layers such as a heat-resistant layer, an adhesive layer, and a protective layer.

[Method for Producing Polyolefin Porous Film]

Examples of a method for producing the polyolefin porous film include, but are not particularly limited to, a method in which a polyolefin-based resin and an additive are mixed and melt-kneaded and then extruded through a T-die to obtain a polyolefin resin composition, and the polyolefin resin composition is subjected to stretching, cleaning and drying.

Specifically, the method can be a method including the following steps of:

(A) melt-kneading a polyolefin-based resin and an additive in a kneader to obtain a molten mixture;

(B) extruding, through a T-die, the molten mixture having been obtained in the step (A), and then shaping the molten mixture into a sheet while cooling the molten mixture, so that a sheet-shaped polyolefin resin composition is obtained;

(C) stretching the sheet-shaped polyolefin resin composition having been obtained in the step (B);

(D) cleaning, with use of a cleaning liquid, the polyolefin resin composition having been stretched in the step (C); and (E) drying and/or heat fixing the polyolefin resin composition having been cleaned in the step (D), so that a polyolefin porous film is obtained.

In the step (A), the polyolefin-based resin is used in an amount of preferably 6% by weight to 45% by weight, and more preferably 9% by weight to 36% by weight, with respect to 100% by weight of the polyolefin resin composition to be obtained.

Examples of the additive in the step (A) include: water-soluble inorganic compounds such as calcium carbonate; phthalate esters such as dioctyl phthalate; unsaturated higher alcohol such as oleyl alcohol; saturated higher alcohol such as stearyl alcohol; low molecular weight polyolefin-based resin such as paraffin wax; petroleum resin; and liquid paraffin.

Examples of the petroleum resin include: (i) an aliphatic hydrocarbon resin obtained through polymerization of a C5 petroleum fraction such as isoprene, pentene, and pentadiene as a main material; (ii) an aromatic hydrocarbon resin obtained through polymerization of a C9 petroleum fraction such as indene, vinyltoluene, and methyl styrene as a main material; (iii) copolymer resins of the aliphatic hydrocarbon resin and the aromatic hydrocarbon resin; (iv) alicyclic saturated hydrocarbon resins obtained through hydrogenation of the resins (i) to (iii); and (v) varying mixtures of the resins (i) to (iv). These additives may be used alone or may be used in combination. Among these additives, a combination of (i) liquid paraffin, which serves as a pore forming agent, and (ii) a petroleum resin is preferably used.

In the step (A), an additive such as liquid paraffin may be added after the polyolefin-based resin is heated and kneaded. In this case, the temperature inside the kneader at the time when liquid paraffin is added is preferably not lower than 140° C. and not higher than 200° C. and more preferably not lower than 172° C. and not higher than 190° C. Note that the temperature inside the kneader is an average temperature of temperatures in three segment barrels, one of which is provided immediately before a section where liquid paraffin is added, another one of which is provided at a section where the liquid paraffin is put in, and the other one of which is provided immediately after the section where the liquid paraffin is put in.

In cooling in the step (B), it is preferable to use, for example, a method in which the molten mixture is put in contact with a cooling roller.

The cooling roller is preferably at a temperature of 5° C. to 60° C. The cooling roller is preferably at a circumferential velocity of 0.1 m/min to 30 m/min, and more preferably 0.5 m/min to 10 m/min.

In the step (C), the sheet-shaped polyolefin resin composition is stretched at a stretch ratio of preferably not less than 3.0 times and not more than 7.0 times, and more preferably not less than 4.5 times and not more than 6.5 times.

Note that the polyolefin resin composition extruded through the T-die can be stretched by sequential biaxial stretching in which the polyolefin resin composition is first stretched in the MD and then stretched in the TD or by another alternative stretching method. As another stretching method, there is, for example, simultaneous biaxial stretching in which the polyolefin resin composition is simultaneously stretched in the MD and the TD.

Examples of the cleaning liquid used in the step (D) include, but are not particularly limited to, hydrocarbon compounds such as heptane and decane; and halogenated hydrocarbon compounds such as methylene chloride.

In the step (E), the polyolefin resin composition having been cleaned is dried and/or subjected to heat treatment at a specific temperature for heat fixing. A drying temperature during the drying is preferably room temperature. The heat fixing is performed at a temperature of preferably not less than 110° C. and not more than 140° C., and more preferably not less than 115° C. and not more than 135° C. Further, the heat fixing is performed for a period of preferably not less than 0.5 minutes and not more than 60 minutes, and more preferably not less than 1 minute and not more than 30 minutes.

In the method for producing a polyolefin porous film contained in the nonaqueous electrolyte secondary battery separator in accordance with an embodiment of the present invention, it is possible to control an internal structure of a porous film to be obtained, particularly, a degree of crystallinity of a constituent resin component in a preferable range by (i) adding a petroleum resin as the additive in the step (A) and further (ii) controlling the temperature and the circumferential velocity of the cooling roller in the above-described ranges, respectively, in the step (B). As a result, it is possible to suitably control a difference between (i) a surface roughness of the nonaqueous electrolyte secondary battery separator measured by a contact measurement method and (ii) a surface roughness of the nonaqueous electrolyte secondary battery separator measured by a non-contact measurement method.

[Embodiment 2: Nonaqueous Electrolyte Secondary Battery Laminated Separator]

A nonaqueous electrolyte secondary battery laminated separator in accordance with Embodiment 2 of the present invention includes (i) a nonaqueous electrolyte secondary battery separator in accordance with Embodiment 1 of the present invention and (ii) an insulating porous layer. Accordingly, the nonaqueous electrolyte secondary battery laminated separator in accordance with Embodiment 2 of the present invention includes a polyolefin porous film constituting the above-described nonaqueous electrolyte secondary battery separator in accordance with Embodiment 1 of the present invention.

[Insulating Porous Layer]

The insulating porous layer constituting the nonaqueous electrolyte secondary battery laminated separator in accordance with an embodiment of the present invention is typically a resin layer containing a resin. This insulating porous layer is preferably a heat-resistant layer or an adhesive layer. The insulating porous layer (hereinafter, also referred to as simply "porous layer") preferably contains a resin that is insoluble in a nonaqueous electrolyte of a battery and that is electrochemically stable when the battery is in normal use.

The porous layer is provided on one surface or both surfaces of the nonaqueous electrolyte secondary battery separator as needed. In a case where the porous layer is provided on one surface of the polyolefin porous film, the porous layer is preferably provided on that surface of the polyolefin porous film which surface faces a positive electrode of a nonaqueous electrolyte secondary battery to be produced, more preferably on that surface of the polyolefin porous film which surface comes into contact with the positive electrode.

Examples of the resin constituting the porous layer encompass polyolefins; (meth)acrylate-based resins; fluorine-containing resins; polyamide-based resins; polyester-based resins; polyimide-based resins; rubbers; resins with a melting point or glass transition temperature of not lower than 180° C.; and water-soluble polymers.

Among the above resins, polyolefins, acrylate-based resins, fluorine-containing resins, polyamide-based resins, polyester-based resins and water-soluble polymers are preferable. As the polyamide resins, wholly aromatic polyamides (aramid resins) are preferable. As the polyester-based resins, polyarylates and liquid crystal polyesters are preferable.

The porous layer may contain fine particles. The term "fine particles" herein means organic fine particles or inorganic fine particles generally referred to as a filler. Therefore, in a case where the porous layer contains fine particles, the above resin contained in the porous layer has a function as a binder resin for binding (i) fine particles together and (ii) fine particles and the porous film. The fine particles are preferably electrically insulating fine particles.

Examples of the organic fine particles contained in the porous layer encompass resin fine particles.

Specific examples of the inorganic fine particles contained in the porous layer encompass fillers made of inorganic matters such as calcium carbonate, talc, clay, kaolin, silica, hydrotalcite, diatomaceous earth, magnesium carbonate, barium carbonate, calcium sulfate, magnesium sulfate, barium sulfate, aluminum hydroxide, boehmite, magnesium hydroxide, calcium oxide, magnesium oxide, titanium oxide, titanium nitride, alumina (aluminum oxide), aluminum nitride, mica, zeolite, and glass. These inorganic fine particles are electrically insulating fine particles. The porous layer may contain only one kind of the fine particles or two or more kinds of the fine particles in combination.

Among the above fine particles, fine particles made of an inorganic matter is suitable. Fine particles made of an inorganic oxide such as silica, calcium oxide, magnesium oxide, titanium oxide, alumina, mica, zeolite, aluminum hydroxide, or boehmite are preferable. Further, fine particles made of at least one kind selected from the group consisting of silica, magnesium oxide, titanium oxide, aluminum hydroxide, boehmite, and alumina are more preferable. Fine particles made of alumina are particularly preferable.

A fine particle content of the porous layer is preferably 1% by volume to 99% by volume, and more preferably 5% by volume to 95% by volume with respect to 100% by volume of the porous layer. In a case where the fine particle content falls within the above range, it is less likely for a void, which is formed when fine particles come into contact with each other, to be blocked by a resin or the like. This makes it possible to achieve sufficient ion permeability and a proper weight per unit area of the porous film.

The porous layer may include a combination of two or more kinds of fine particles which differ from each other in particle or specific surface area.

A thickness of the porous layer is preferably 0.5 μm to 15 μm (per surface of the nonaqueous electrolyte secondary battery laminated separator), and more preferably 2 μm to 10 μm (per surface of the nonaqueous electrolyte secondary battery laminated separator).

If the thickness of the porous layer is less than 1 μm, it may not be possible to sufficiently prevent an internal short circuit caused by breakage or the like of a battery. In addition, an amount of electrolyte solution to be retained by the porous layer may decrease. In contrast, if a total thickness of porous layers on both surfaces of the nonaqueous electrolyte secondary battery separator is above 30 μm, then a rate characteristic or a cycle characteristic may deteriorate.

The weight per unit area of the porous layer (per surface of the nonaqueous electrolyte secondary battery laminated separator) is preferably 1 $g/m^2$ to 20 $g/m^2$, and more preferably 4 $g/m^2$ to 10 $g/m^2$.

A volume per square meter of a porous layer constituent component contained in the porous layer (per surface of the nonaqueous electrolyte secondary battery laminated separator) is preferably 0.5 $cm^3$ to 20 $cm^3$, more preferably 1 $cm^3$ to 10 $cm^3$, and still more preferably 2 $cm^3$ to 7 $cm^3$.

For the purpose of obtaining sufficient ion permeability, a porosity of the porous layer is preferably 20% by volume to 90% by volume, and more preferably 30% by volume to 80% by volume. In order for a nonaqueous electrolyte secondary battery laminated separator to obtain sufficient ion permeability, a pore diameter of each of pores of the porous layer is preferably not more than 3 μm, and more preferably not more than 1 μm.

[Laminated Body]

A laminated body which is the nonaqueous electrolyte secondary battery laminated separator in accordance with Embodiment 2 of the present invention includes a nonaqueous electrolyte secondary battery separator in accordance with an embodiment of the present invention and an insulating porous layer. The laminated body is preferably arranged such that the above-described insulating porous layer is provided on one surface or both surfaces of the nonaqueous electrolyte secondary battery separator in accordance with an embodiment of the present invention.

The laminated body in accordance with an embodiment of the present invention has a thickness of preferably 5.5 µm to 45 µm, and more preferably 6 µm to 25 µm.

The laminated body in accordance with an embodiment of the present invention has an air permeability of preferably 30 sec/100 mL to 1000 sec/100 mL, and more preferably 50 sec/100 mL to 800 sec/100 mL, in terms of Gurley values.

The laminated body in accordance with an embodiment of the present invention may include, in addition to the polyolefin porous film and the insulating porous layer which are described above, a publicly known porous film(s) (porous layer(s)) such as a heat-resistant layer, an adhesive layer, and a protective layer according to need as long as such a porous film does not prevent an object of an embodiment of the present invention from being attained.

The laminated body in accordance with an embodiment of the present invention includes, as a base material, a nonaqueous electrolyte secondary battery separator having the above-described "product of Ra differences" in a specific range. Therefore, while the strength of the laminated body is maintained, the nonaqueous electrolyte secondary battery including the laminated body as a nonaqueous electrolyte secondary battery laminated separator can have an enhanced level of safety.

[Method for Producing Porous Layer and Method for Producing Laminated Body]

The insulating porous layer in accordance with an embodiment of the present invention and the laminated body in accordance with an embodiment of the present invention can be each produced by, for example, applying a coating solution (described later) to a surface of the polyolefin porous film of the nonaqueous electrolyte secondary battery separator in accordance with an embodiment of the present invention and then drying the coating solution so as to deposit the insulating porous layer.

Prior to applying the coating solution to a surface of the polyolefin porous film of the nonaqueous electrolyte secondary battery separator in accordance with an embodiment of the present invention, the surface to which the coating solution is to be applied can be subjected to a hydrophilization treatment as needed.

The coating solution for use in a method for producing the porous layer in accordance with an embodiment of the present invention and a method for producing the laminated body in accordance with an embodiment of the present invention can be prepared typically by (i) dissolving, in a solvent, a resin that may be contained in the porous layer described above and (ii) dispersing, in the solvent, fine particles that may be contained in the porous layer described above. The solvent in which the resin is to be dissolved here also serves as a dispersion medium in which the fine particles are to be dispersed. Depending on the solvent, the resin may be an emulsion.

The solvent (dispersion medium) is not limited to any particular one, provided that (i) the solvent does not have an adverse effect on the polyolefin porous film, (ii) the solvent allows the resin to be uniformly and stably dissolved in the solvent, and (iii) the solvent allows the fine particles to be uniformly and stably dispersed in the solvent. Specific examples of the solvent (dispersion medium) encompass water and organic solvents. Only one of these solvents can be used, or two or more of these solvents can be used in combination.

The coating solution may be formed by any method, provided that the coating solution can meet conditions, such as a resin solid content (resin concentration) and a fine particle amount, which are necessary for obtaining a desired porous layer. Specific examples of the method of forming the coating solution encompass a mechanical stirring method, an ultrasonic dispersion method, a high-pressure dispersion method, and a media dispersion method. Further, the coating solution may contain, as a component(s) other than the resin and the fine particles, an additive(s) such as a disperser, a plasticizer, a surfactant, and/or a pH adjustor, provided that the additive does not prevent the object of an embodiment of the present invention from being attained. Note that the additive may be contained in an amount that does not prevent the object of an embodiment of the present invention from being attained.

A method of applying the coating solution to the porous film, that is, a method of forming a porous layer on a surface of the polyolefin porous film is not limited to any particular one. The porous layer can be formed by, for example, (i) a method including the steps of applying the coating solution directly to a surface of the polyolefin porous film and then removing the solvent (dispersion medium), (ii) a method including the steps of applying the coating solution to an appropriate support, removing the solvent (dispersion medium) for formation of a porous layer, then pressure-bonding the porous layer to the polyolefin porous film, and subsequently peeling the support off, and (iii) a method including the steps of applying the coating solution to a surface of an appropriate support, then pressure-bonding the polyolefin porous film to that surface, then peeling the support off, and subsequently removing the solvent (dispersion medium).

The coating solution can be applied by a conventionally publicly known method. Specific examples of such a method include a gravure coater method, a dip coater method, a bar coater method, and a die coater method.

The solvent (dispersion medium) is generally removed by a drying method. The solvent (dispersion medium) contained in the coating solution may be replaced with another solvent before a drying operation.

[Embodiment 3: Nonaqueous Electrolyte Secondary Battery Member, and Embodiment 4: Nonaqueous Electrolyte Secondary Battery]

A nonaqueous electrolyte secondary battery member in accordance with Embodiment 3 of the present invention is obtained by including a positive electrode, a nonaqueous electrolyte secondary battery separator in accordance with Embodiment 1 of the present invention or a nonaqueous electrolyte secondary battery laminated separator in accordance with Embodiment 2 of the present invention, and a negative electrode, the positive electrode, the nonaqueous electrolyte secondary battery separator or the nonaqueous electrolyte secondary battery laminated separator, and the negative electrode being disposed in this order.

A nonaqueous electrolyte secondary battery in accordance with Embodiment 4 of the present invention includes the nonaqueous electrolyte secondary battery separator in accordance with Embodiment 1 of the present invention or the nonaqueous electrolyte secondary battery laminated separator in accordance with Embodiment 2 of the present invention.

A nonaqueous electrolyte secondary battery in accordance with an embodiment of the present invention can be, for example, a nonaqueous secondary battery that achieves an electromotive force through doping with and dedoping of lithium, and can include a nonaqueous electrolyte secondary battery member including a positive electrode, a nonaqueous electrolyte secondary battery separator in accordance with an embodiment of the present invention, and a negative electrode, the positive electrode, the nonaqueous electrolyte secondary battery separator, and the negative electrode being disposed in this order. Alternatively, the nonaqueous electrolyte secondary battery in accordance with an embodiment of the present invention can be, for example, a nonaqueous secondary battery that achieves an electromotive force through doping with and dedoping of lithium, and can be a lithium-ion secondary battery that includes a nonaqueous electrolyte secondary battery member including a positive electrode, a porous layer, a nonaqueous electrolyte secondary battery separator in accordance with an embodiment of the present invention, and a negative electrode which are disposed in this order, that is, a lithium-ion secondary battery that includes a nonaqueous electrolyte secondary battery member including a positive electrode, a nonaqueous electrolyte secondary battery laminated separator in accordance with an embodiment of the present invention, and a negative electrode which are disposed in this order. Note that constituent elements, other than the nonaqueous electrolyte secondary battery separator, of the nonaqueous electrolyte secondary battery are not limited to those described below.

The nonaqueous electrolyte secondary battery in accordance with an embodiment of the present invention is typically arranged so that a battery element is enclosed in an exterior member, the battery element including (i) a structure in which the negative electrode and the positive electrode faces each other via the nonaqueous electrolyte secondary battery separator in accordance with an embodiment of the present invention or the nonaqueous electrolyte secondary battery laminated separator in accordance with an embodiment of the present invention and (ii) an electrolyte with which the structure is impregnated. The nonaqueous electrolyte secondary battery is preferably a secondary battery including a nonaqueous electrolyte, and is particularly preferably a lithium-ion secondary battery. Note that the doping means occlusion, support, adsorption, or insertion, and means a phenomenon in which lithium ions enter an active material of an electrode (e.g., a positive electrode).

Since the nonaqueous electrolyte secondary battery member in accordance with an embodiment of the present invention includes the nonaqueous electrolyte secondary battery separator in accordance with an embodiment of the present invention or the nonaqueous electrolyte secondary battery laminated separator in accordance with an embodiment of the present invention, the strength and the level of safety of a nonaqueous electrolyte secondary battery can be improved in a well-balanced manner in a case where the nonaqueous electrolyte secondary battery separator member is included in the nonaqueous electrolyte secondary battery. Since the nonaqueous electrolyte secondary battery in accordance with an embodiment of the present invention includes the nonaqueous electrolyte secondary battery separator in accordance with an embodiment of the present invention which has the above-described "product of Ra differences" adjusted in a specific range, the nonaqueous electrolyte secondary battery advantageously has both excellent strength and an excellent level of safety.

<Positive Electrode>

A positive electrode included in the nonaqueous electrolyte secondary battery member in accordance with an embodiment of the present invention or in the nonaqueous electrolyte secondary battery in accordance with an embodiment of the present invention is not limited to any particular one, provided that the positive electrode is one that is generally used as a positive electrode of a nonaqueous electrolyte secondary battery. Examples of the positive electrode encompass a positive electrode sheet having a structure in which an active material layer containing a positive electrode active material and a binder resin is formed on a current collector. The active material layer may further contain an electrically conductive agent and/or a binding agent.

The positive electrode active material is, for example, a material capable of being doped with and dedoped of lithium ions. Specific examples of such a material encompass a lithium complex oxide containing at least one transition metal such as V, Mn, Fe, Co, or Ni.

Examples of the electrically conductive agent include carbonaceous materials such as natural graphite, artificial graphite, cokes, carbon black, pyrolytic carbons, carbon fiber, and a fired product of an organic polymer compound. It is possible to use only one kind of the above electrically conductive agents or two or more kinds of the above electrically conductive agents in combination.

Examples of the binding agent encompass (i) fluorine-based resins such as polyvinylidene fluoride, (ii) acrylic resin, and (iii) styrene butadiene rubber. Note that the binding agent serves also as a thickener.

Examples of the positive electrode current collector encompass electric conductors such as Al, Ni, and stainless steel. Among these, Al is preferable because Al is easily processed into a thin film and is inexpensive.

Examples of a method for producing the positive electrode sheet encompass: a method in which a positive electrode active material, an electrically conductive agent, and a binding agent are pressure-molded on a positive electrode current collector; and a method in which (i) a positive electrode active agent, an electrically conductive agent, and a binding agent are formed into a paste with the use of a suitable organic solvent, (ii) then, a positive electrode current collector is coated with the paste, and (iii) subsequently, the paste is dried and then pressured so that the paste is firmly fixed to the positive electrode current collector.

<Negative Electrode>

A negative electrode included in the nonaqueous electrolyte secondary battery member in accordance with an embodiment of the present invention or in the nonaqueous electrolyte secondary battery in accordance with an embodiment of the present invention is not limited to any particular one, provided that the negative electrode is one that is generally used as a negative electrode of a nonaqueous electrolyte secondary battery. Examples of the negative electrode encompass a negative electrode sheet having a structure in which an active material layer containing a negative electrode active material and a binder resin is formed on a current collector. The active material layer may further contain an electrically conductive agent.

Examples of the negative electrode active material encompass (i) a material capable of being doped with and dedoped of lithium ions, (ii) lithium metal, and (iii) lithium alloy. Examples of such a material encompass carbonaceous materials such as natural graphite, artificial graphite, cokes, carbon black, and pyrolytic carbon.

Examples of the negative electrode current collector encompass Cu, Ni, and stainless steel. Among these, Cu is more preferable because Cu is not easily alloyed with lithium especially in a lithium-ion secondary battery and is easily processed into a thin film.

Examples of a method for producing the negative electrode sheet encompass: a method in which a negative electrode active material is pressure-molded on a negative electrode current collector; and a method in which (i) a negative electrode active material is formed into a paste with the use of a suitable organic solvent, (ii) then, a negative electrode current collector is coated with the paste, and (iii) subsequently, the paste is dried and then pressured so that the paste is firmly fixed to the negative electrode current collector. The above paste preferably includes the above electrically conductive agent and the binding agent.

<Nonaqueous Electrolyte>

A nonaqueous electrolyte in a nonaqueous electrolyte secondary battery in accordance with an embodiment of the present invention is not limited to any particular one, provided that the nonaqueous electrolyte is one that is generally used for a nonaqueous electrolyte secondary battery. The nonaqueous electrolyte can be one prepared by, for example, dissolving a lithium salt in an organic solvent. Examples of the lithium salt encompass $LiClO_4$, $LiPF_6$, $LiAsF_6$, $LiSbF_6$, $LiBF_4$, $LiCF_3SO_3$, $LiN(CF_3SO_2)_2$, $LiC(CF_3SO_2)_3$, $Li_2B_{10}Cl_{10}$, lower aliphatic carboxylic acid lithium salt, and $LiAlCl_4$. It is possible to use only one kind of the above lithium salts or two or more kinds of the above lithium salts in combination.

Examples of the organic solvent to be contained in the nonaqueous electrolyte encompass carbonates, ethers, esters, nitriles, amides, carbamates, and sulfur-containing compounds, and fluorine-containing organic solvents each obtained by introducing a fluorine group into any of these organic solvents. It is possible to use only one kind of the above organic solvents or two or more kinds of the above organic solvents in combination.

<Method For Producing Nonaqueous Electrolyt Secondary Battery Member and Method For Producing Nonaqueous Electrolyte Secondary Battery>

A nonaqueous electrolyte secondary battery member in accordance with an embodiment of the present invention can be produced by, for example, disposing the positive electrode, the nonaqueous electrolyte secondary battery separator in accordance with an embodiment of the present invention or the nonaqueous electrolyte secondary battery laminated separator in accordance with an embodiment of the present invention, and the negative electrode in this order.

Further, a nonaqueous electrolyte secondary battery in accordance with an embodiment of the present invention can be produced by, for example, (i) forming a nonaqueous electrolyte secondary battery member by the method described above, (ii) placing the nonaqueous electrolyte secondary battery member in a container which is to serve as a housing of the nonaqueous electrolyte secondary battery, (iii) filling the container with a nonaqueous electrolyte, and then (iv) hermetically sealing the container while reducing the pressure inside the container.

EXAMPLES

The following description will discuss embodiments of the present invention in greater detail with reference to Examples and Comparative Examples. Note, however, that the present invention is not limited to the following Examples and Comparative Examples below.

[Measurement Method]

The following method was used for measurement of physical properties and the like of a polyolefin porous film produced in each of Examples 1 and 2 and Comparative Examples 1 and 2.

[Thickness of Film]

A thickness of the polyolefin porous film was measured with the use of a high-precision digital measuring device (VL-50) manufactured by Mitutoyo Corporation.

[Air Permeability]

An air permeability of the polyolefin porous film was measured with use of a digital Oken-type air permeability tester EGO1 manufactured by Asahi Seiko Co., Ltd.

[Piercing Strength]

The polyolefin porous film was fixed with a washer of 12 mmΦ. Then, a pin (pin diameter: 1 mmΦ and a tip radius of 0.5 R) was pierced through the polyolefin porous film at 200 mm/min. A maximum stress (gf) at the time when the polyolefin porous film was pierced was measured and a value obtained by this measurement was defined as a piercing strength of the polyolefin porous film.

[Shutdown Temperature (SD Temperature)]

A circular measurement sample having a diameter of 19.4 mm was punched out from the polyolefin porous film, and this sample was set as a measurement sample. Further, members of 2032 Type Coin Cell (manufactured by Hohsen Corporation) were prepared. The members were a top cover, a bottom cover, a gasket, a kapton ring (having an outer diameter of 16.4 mm, an inner diameter of 8 mm, and a thickness of 0.05 mm), a spacer (circular spacer having a diameter of 15.5 mm and a thickness of 0.5 mm), and an aluminum ring (having an outer diameter of 16 mm, an inner diameter of 10 mm, and a thickness of 1.6 mm).

Then, the measurement sample and the gasket were placed in this order from the bottom cover and the measurement sample was impregnated with 10 μmL of an electrolyte. Thereafter, the kapton ring, the spacer, the aluminum ring, and the top cover were provided above the measurement sample in this order and these members with the measurement sample were sealed with a coin cell caulking device (manufactured by Hohsen Corporation), so that a measurement coin cell was prepared. The electrolyte used here was a nonaqueous electrolyte (i) obtained by dissolving $LiBF_4$ in a mixed solvent in which propylene carbonate and NIKKOLBT-12 (manufactured by Nikko Chemicals Co., Ltd.) were mixed at a volume ratio of 91.5:8.5, and (ii) having a temperature of 25° C. and an $LiBF_4$ concentration of 1.0 mol/L. A temperature inside the measurement coin cell was continuously measured by use of a Digital Multimeter (7352A, manufactured by ADC CORPORATION) while being increased from a room temperature to 150° C. at a rate of 15° C./min, and a resistance value at 1 kHz in the coin cell was continuously measured by use of an LCR Meter (IM3523, manufactured by HIOKI E.E. CORPORATION).

The coin cell which had a resistance value of not less than 2000Ω at 1 kHz during the measurement was considered to have a shutdown function.

In this case, from a graph showing a relationship between a cell temperature and a resistance value, a point of intersection of a tangent to a resistance value of 2000Ω and a straight line, which is an extension line of a base resistance value obtained before the resistance started to greatly increase, was assumed to be a shutdown temperature (SD temperature) of the polyolefin porous film.

[Surface Roughness]

<Contact Measurement Method>

As a contact-type surface roughness measurement apparatus, "HANDYSURF (E-35A)" manufactured by Tokyo Seimitsu Co., Ltd. was used. The tip of the probe of a measurement head of the contact-type surface roughness measurement apparatus was cone-shaped, with an angle of 60 degrees. The radius of the tip of the probe was 2 μm.

The surface roughness measurement apparatus was set as follows: measurement force=0.75 mN; measurement speed=0.6 mm/s; evaluation length=5.0 mm; and cutoff value=0.8 mm. Then, a test piece was prepared such that the MD of the polyolefin porous film corresponded to a long side direction, while the TD of the polyolefin porous film corresponded to a short side direction. The surface roughness measurement of the test piece was carried out twice per direction by a contact measurement method.

Respective average values thus obtained in the above directions (the MD and the TD) were defined as a surface roughness $Ra_{contact,\ MD}$ in the MD obtained by a contact measurement and a surface roughness $Ra_{contact,\ TD}$ in the TD obtained by a contact measurement.

<Non-Contact Measurement Method>

As a non-contact-type roughness measurement apparatus, "VertScan [registered trademark] 2.0 R5500GML" manufactured by Ryoka Systems Inc. was used. The measurement conditions are as follows.

Objective lens: 5× (Michelson type)
Intermediate lens: 1×
Wavelength filter: 530 nm
CCD camera: ⅓ inch
Measurement mode: Wave
Cutoff: None The surface roughness of the polyolefin porous film was obtained by a non-contact measurement. The one-dimensional surface roughness Ra for a length of 500 μm was obtained for each of the MD and the TD from two-dimensional data obtained at a measurement point. The above operation was repeated at arbitrarily selected 5 points of the polyolefin porous film. Respective average values in the above directions were calculated from values thus obtained and defined as a surface roughness $Ra_{non\text{-}contact,\ MD}$ in the MD obtained by a non-contact measurement and a surface roughness $Ra_{non\text{-}contact,\ TD}$ in the TD obtained by a non-contact measurement, respectively.

<Calculating Product of Ra Differences>

A product of Ra differences was calculated by using the $Ra_{contact,\ MD}$, $Ra_{non\text{-}contact,\ MD}$, $Ra_{contact,\ TD}$, and $Ra_{non\text{-}contact,\ TD}$, which had been calculated above.

Example 1

First, 18% by weight of ultra-high molecular weight polyethylene powder (HI-ZEX MILLION 145M, manufactured by Mitsui Chemicals, Inc.) and 2% by weight of hydrogenated petroleum resin (softening point: 90° C.) were prepared. These powders were pulverized and mixed by a blender, so that a mixed powder was obtained. Here, pulverization was carried out until particles of the powders had the same particle diameter.

The mixed powder was then fed to a twin screw kneading extruder by a quantitative feeder, and melt-kneaded in the twin screw kneading extruder. Subsequently, a resultant melt-kneaded material was extruded through a T-die via a gear pump, so that a sheet-shaped polyolefin resin composition was obtained. Meanwhile, when the mixed powder was melt-kneaded, 80% by weight of liquid paraffin was added under pressure into the twin screw kneading extruder via a pump, and melt-kneaded together with the mixed powder. At this time, an average temperature of segment barrels was set at 173.1° C. The segment barrels were segment barrels positioned immediately before a section where the liquid paraffin was put in, at the section where the liquid paraffin was put in, and immediately after the section where the liquid paraffin was put in. The polyolefin resin composition was cooled by a cooling roller at 40° C., so that a roll of the sheet-shaped polyolefin resin composition was obtained. In this case, the circumferential velocity of the cooling roller was set at 1.3 m/min.

Next, the sheet-shaped polyolefin resin composition was stretched at a stretch ratio of 6.4 times in the MD at 117° C. and then stretched at a stretch ratio of 6.0 times in the TD at 115° C. The polyolefin resin composition thus stretched was cleaned with use of a cleaning liquid (heptane). Thereafter, the polyolefin resin composition having been cleaned was dried at room temperature, and then placed in an oven at 129° C. for heat fixing for 5 minutes, so that a polyolefin porous film was obtained. The polyolefin porous film thus produced had a thickness of 15.7 μm and an air permeability of 115 sec/100 mL.

Example 2

First, 18% by weight of ultra-high molecular weight polyethylene powder (HI-ZEX MILLION 145M, manufactured by Mitsui Chemicals, Inc.) and 2% by weight of hydrogenated petroleum resin (softening point: 125° C.) were prepared. These powders were pulverized and mixed by a blender, so that a mixed powder was obtained. Here, pulverization was carried out until particles of the powders had the same particle diameter.

The mixed powder was then fed to a twin screw kneading extruder by a quantitative feeder, and melt-kneaded in the twin screw kneading extruder. Subsequently, a resultant melt-kneaded material was extruded through a T-die via a gear pump, so that a sheet-shaped polyolefin resin composition was obtained. Meanwhile, when the mixed powder was melt-kneaded, 80% by weight of liquid paraffin was added under pressure into the twin screw kneading extruder via a pump, and melt-kneaded together with the mixed powder. At this time, an average temperature of segment barrels was set at 179.6° C. The segment barrels were segment barrels positioned immediately before a section where the liquid paraffin was put in, at the section where the liquid paraffin was put in, and immediately after the section where the liquid paraffin was put in. The polyolefin resin composition was cooled by a cooling roller at 40° C., so that a roll of the sheet-shaped polyolefin resin composition was obtained. In this case, the circumferential velocity of the cooling roller was set at 1.3 m/min.

Next, the sheet-shaped polyolefin resin composition was stretched at a stretch ratio of 6.4 times in the MD at 117° C. and then stretched at a stretch ratio of 6.0 times in the TD at 115° C. The polyolefin resin composition thus stretched was cleaned with use of a cleaning liquid (heptane). Thereafter, the polyolefin resin composition having been cleaned was dried at room temperature, and then placed in an oven at 129° C. for heat fixing for 5 minutes, so that a polyolefin porous film was obtained. The polyolefin porous film thus produced had a thickness of 15.7 μm and an air permeability of 86 sec/100 mL.

Comparative Example 1

First, 20% by weight of ultra-high molecular weight polyethylene powder (HI-ZEX MILLION 145M, manufactured by Mitsui Chemicals, Inc.) was prepared. The powder was then fed to a twin screw kneading extruder by a quantitative feeder, and melt-kneaded in the twin screw kneading extruder. Subsequently, a resultant melt-kneaded material was extruded through a T-die via a gear pump, so that a sheet-shaped polyolefin resin composition was obtained. Meanwhile, when the mixed powder was melt-kneaded, 80% by weight of liquid paraffin was added under pressure into the twin screw kneading extruder via a pump, and melt-kneaded together with the mixed powder. At this time, an average temperature of segment barrels was set at 170.4° C. The segment barrels were segment barrels positioned immediately before a section where the liquid paraffin was put in, at the section where the liquid paraffin was put in, and immediately after the section where the liquid paraffin was put in. The polyolefin resin composition was cooled by a cooling roller at 40° C., so that a roll of the sheet-shaped polyolefin resin composition was obtained. In this case, the circumferential velocity of the cooling roller was set at 1.3 m/min.

Next, the sheet-shaped polyolefin resin composition was stretched at a stretch ratio of 6.4 times in the MD at 117° C. and then stretched at a stretch ratio of 6.0 times in the TD at 115° C. The polyolefin resin composition thus stretched was cleaned with use of a cleaning liquid (heptane). Thereafter, the polyolefin resin composition having been cleaned was dried at room temperature, and then placed in an oven at 127° C. for heat fixing for 5 minutes, so that a polyolefin porous film was obtained. The polyolefin porous film thus produced had a thickness of 18.8 μm and an air permeability of 157 sec/100 mL.

Comparative Example 2

First, 72% by weight of ultra-high molecular weight polyethylene powder (GUR2024, manufactured by Ticona Corporation) and 28% by weight of polyethylene wax (FNP-0115, manufactured by Nippon Seiro Co., Ltd.) having a weight-average molecular weight of 1,000 were prepared, i.e., 100 parts by weight in total of the ultra-high molecular weight polyethylene and the polyethylene wax were prepared. Then, 0.4 parts by weight of an antioxidant (Irg1010, manufactured by Ciba Specialty Chemicals Corporation), 0.1 parts by weight of an antioxidant (P168, manufactured by Ciba Specialty Chemicals Corporation), and 1.3 parts by weight of sodium stearate were added to 100 parts by weight by weight of the ultra-high molecular weight polyethylene and the polyethylene wax. Then, calcium carbonate (manufactured by Maruo Calcium Co., Ltd.) having an average particle diameter of 0.1 μm was further added so that the calcium carbonate accounted for 38% by volume of the total volume. Then, the above materials in powder form were mixed by a Henschel mixer, and were then melt-kneaded by a twin screw kneading extruder, and thus a polyolefin resin composition was obtained. At this time, a barrel temperature in the twin screw kneading extruder was set at 200° C. Then, the polyolefin resin composition was rolled with use of a pair of rollers each having a surface temperature of 150° C., so that a sheet was produced. The sheet thus produced was immersed in a hydrochloric acid aqueous solution (4 mol/L of hydrochloric acid, 0.5% by weight of a nonionic surfactant), so that the calcium carbonate was removed. Then, the sheet was stretched at a stretch ratio of 6.2 times at a temperature of 105° C., so that a polyolefin porous film was obtained. The polyolefin porous film thus produced had a thickness of 15.5 μm and an air permeability of 107 sec/100 mL.

[Results]

The above methods were used for measurement of a "product of Ra differences", a "piercing strength", and an "SD temperature" of the polyolefin porous film (nonaqueous electrolyte secondary battery separator) produced in each of Examples 1 and 2 and Comparative Examples 1 and 2. Table 1 below shows measurement results.

TABLE 1

|  | Product of Ra Differences [μm²] | Piercing Strength [Gf] | SD Temperature [° C.] |
| --- | --- | --- | --- |
| Example 1 | 0.0040 | 467 | 138 |
| Example 2 | 0.0191 | 435 | 138 |
| Comparative Example 1 | 0.0001 | 610 | 141 |
| Comparative Example 2 | 0.0297 | 362 | 133 |

[Conclusion]

The following is clear from Table 1. In the case of the nonaqueous electrolyte secondary battery separator which was produced in Comparative Example 1 and had a product of Ra differences of less than 0.0020, though the piercing strength was high, the level of safety was insufficient since the SD temperature was high. Accordingly, the nonaqueous electrolyte secondary battery separator produced in Comparative Example 1 is considered to have an excessively large proportion of a surface layer portion 1 which is mainly made of a crystalline portion, as illustrated in FIG. 3.

Meanwhile, in the case of the nonaqueous electrolyte secondary battery separator which was produced in Comparative Example 2 and had a product of Ra differences of larger than 0.0280, though the SD temperature was lower, the strength was insufficient since the piercing strength was too low. Accordingly, the nonaqueous electrolyte secondary battery separator produced in Comparative Example 2 is considered to have an excessively large proportion of an interior portion 2 which is mainly made of a non-crystalline portion, as illustrated in FIG. 4.

In contrast, in the case of the nonaqueous electrolyte secondary battery separators each of which was produced in Example 1 or 2 and had a product of Ra differences of not less than 0.0020 and not more than 0.0280, the piercing strength was sufficiently high and since the SD temperature was sufficiently low, the level of safety was also excellent. Accordingly, the nonaqueous electrolyte secondary battery separator produced in each of Examples 1 and 2 is considered to have a surface layer portion 1 that is mainly made of a crystalline portion and an interior portion 2 that is mainly made of a non-crystalline portion in a well-balanced manner, as illustrated in FIG. 2.

INDUSTRIAL APPLICABILITY

A nonaqueous electrolyte secondary battery separator in accordance with an embodiment of the present invention is excellent in both strength and level of safety. Therefore, the nonaqueous electrolyte secondary battery separator can be suitably used for production of a nonaqueous electrolyte secondary battery having an enhanced level of safety.

REFERENCE SIGNS LIST 1 surface layer portion
2 interior portion

The invention claimed is:
1. A method of producing a nonaqueous electrolyte secondary battery separator including a polyolefin porous film, comprising the steps of:

(A) melt-kneading a polyolefin-based resin powder and an additive in a kneader to obtain a polyolefin resin composition, the kneader having an internal temperature of not lower than 172° C. and not higher than 200° C.;

(B) extruding the polyolefin resin composition through a T-die of an extruder, and then shaping the polyolefin resin composition into a sheet while cooling the polyolefin resin composition using a cooling roller having a temperature of 5° C. to 60° C., so that a sheet-shaped polyolefin resin composition is obtained;

(C) stretching the sheet-shaped polyolefin resin composition;

(D) cleaning, with use of a cleaning liquid, the stretched polyolefin resin composition; and (E) drying and/or heat fixing the cleaned polyolefin resin composition, so that a polyolefin porous film is obtained, wherein in regard to a surface of the nonaqueous electrolyte secondary battery separator, a product obtained by multiplying (a) a difference between a surface roughness in a machine direction obtained by a contact measurement and a surface roughness in the machine direction obtained by a non-contact measurement by (b) a difference between a surface roughness in a transverse direction obtained by a contact measurement and a surface roughness in the transverse direction obtained by a non-contact measurement is not less than 0.0020 and not more than 0.0280.

2. The method according to claim 1, wherein in the step (A), the additive includes a petroleum resin.

3. The method according to claim 1, wherein in the step (B), the cooling roller has a circumferential velocity of 0.1 m/min to 30 m/min.

4. The method according to claim 1, wherein the polyolefin porous film has a thickness of not more than 19.5 μm.

5. A method of producing a nonaqueous electrolyte secondary battery laminated separator including a nonaqueous electrolyte secondary battery separator and an insulating porous layer, comprising the steps of:

producing the nonaqueous electrolyte secondary battery separator via the method recited in claim 1; and providing the insulating porous layer to one surface or both surfaces of the nonaqueous electrolyte secondary battery separator.

6. A method of producing a nonaqueous electrolyte secondary battery member including a positive electrode, a nonaqueous electrolyte secondary battery separator, and a negative electrode which are disposed in this order, comprising the steps of:

producing the nonaqueous electrolyte secondary battery separator via the method recited in claim 1; and disposing the positive electrode, the nonaqueous electrolyte secondary battery separator, and the negative electrode in this order.

7. A method of producing a nonaqueous electrolyte secondary battery including a nonaqueous electrolyte secondary battery separator, comprising the steps of:

producing the nonaqueous electrolyte secondary battery separator via the method recited in claim 1;

producing a nonaqueous electrolyte secondary battery member in which a positive electrode, the nonaqueous electrolyte secondary battery separator, and a negative electrode are disposed in this order; and placing the nonaqueous electrolyte secondary battery member in a container which is to serve as a housing of the nonaqueous electrolyte secondary battery, filling the container with a nonaqueous electrolyte, and then hermetically sealing the container while reducing pressure inside the container.

8. A method of producing a nonaqueous electrolyte secondary battery member including a positive electrode, a nonaqueous electrolyte secondary battery laminated separator and a negative electrode which are disposed in this order, comprising the steps of:

producing the nonaqueous electrolyte secondary battery laminated separator via the method recited in claim 5; and disposing the positive electrode, the nonaqueous electrolyte secondary battery laminated separator, and the negative electrode in this order.

9. A method of producing a nonaqueous electrolyte secondary battery including a nonaqueous electrolyte secondary battery laminated separator, comprising the steps of:

producing the nonaqueous electrolyte secondary battery laminated separator via the method recited in claim 5;

producing a nonaqueous electrolyte secondary battery member in which a positive electrode, the nonaqueous electrolyte secondary battery laminated separator, and a negative electrode are disposed in this order; and placing the nonaqueous electrolyte secondary battery member in a container which is to serve as a housing of the nonaqueous electrolyte secondary battery, filling the container with a nonaqueous electrolyte, and then hermetically sealing the container while reducing pressure inside the container.

10. The method according to claim 1, wherein:

in regard to a surface of the nonaqueous electrolyte secondary battery separator, an absolute value of the difference between the surface roughness in the machine direction obtained by the contact measurement and the surface roughness in the machine direction obtained by the non-contact measurement is not less than 0.04 and not more than 0.30; and an absolute value of the difference between the surface roughness in the transverse direction obtained by the contact measurement and the surface roughness in the transverse direction obtained by the non-contact measurement is not less than 0.04 and not more than 0.30.

11. The method according to claim 5, wherein the insulating porous layer includes a polyamide-based resin.

* * * * *